(12) United States Patent
Takahashi et al.

(10) Patent No.: US 6,788,368 B2
(45) Date of Patent: Sep. 7, 2004

(54) TRANSMISSION LIGHT-SCATTERING LAYER SHEET AND LIQUID CRYSTAL DISPLAY

(75) Inventors: Hiroshi Takahashi, Himeji (JP); Yoshiyuki Nishida, Nagareyama (JP); Masaya Omura, Himeji (JP); Shuji Nakatsuka, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 22 days.

(21) Appl. No.: 09/979,524
(22) PCT Filed: Mar. 21, 2001
(86) PCT No.: PCT/JP01/02203
§ 371 (c)(1),
(2), (4) Date: Nov. 23, 2001
(87) PCT Pub. No.: WO01/71395
PCT Pub. Date: Sep. 27, 2001

(65) Prior Publication Data
US 2003/0025856 A1 Feb. 6, 2003

(30) Foreign Application Priority Data
Mar. 23, 2000 (JP) ........................................ 2000-082423
Dec. 20, 2000 (JP) ........................................ 2000-387824

(51) Int. Cl.[7] ............................................. G02F 1/1335
(52) U.S. Cl. ........................................ 349/115; 349/86
(58) Field of Search .......................... 349/115, 106, 349/86

(56) References Cited
U.S. PATENT DOCUMENTS

| 5,607,764 A | 3/1997 | Konno et al. |
| 6,093,344 A | 7/2000 | Park et al. |
| 6,266,113 B1 * | 7/2001 | Yamazaki et al. .......... 349/115 |
| 6,452,650 B1 * | 9/2002 | Nakao et al. .................. 349/86 |

FOREIGN PATENT DOCUMENTS

| DE | 198 28 630 A1 | 1/1999 |
| JP | B2-61-8430 | 3/1986 |
| JP | A63-228887 | 9/1988 |
| JP | A6-51289 | 2/1994 |
| JP | A7-27904 | 1/1995 |
| JP | A7-98452 | 4/1995 |
| JP | A7-114013 | 5/1995 |
| JP | A7-261171 | 10/1995 |
| JP | A8-7509 | 3/1996 |
| JP | A9-113902 | 5/1997 |
| JP | A20001-51105 | 2/2001 |

OTHER PUBLICATIONS

Japanese Liquid Crystal Society Lecture Meeting, Synopsis of the Lectures (1998).

* cited by examiner

*Primary Examiner*—John Niebling
(74) *Attorney, Agent, or Firm*—Birch, Stewart, Kolasch & Birch, LLP

(57) ABSTRACT

The reflective liquid crystal display device comprises a polarizing plate disposed forwardly of a liquid crystal cell, a relector which is disposed on backside of the liquid crystal cell and reflects an incident light, and a light-scattering sheet which is disposed forwardly of the reflector and scatters the incident light isotopically. The light-scattering sheet can be prepared with the use of a spinodal decomposition method of coating a mixture liquid containing a plurality of polymers varying in refractive index on a transparent support and evaporating or removing a solvent to form a light-scattering layer having a droplet phase structure. The light-scattering layer includes a light-scattering layer showing a maximum intensity of the scattered-light at scattering angles of 3 to 40°, and a light-scattering layer showing maximums intensity of the scattered-light respectively at smaller angles of 2 to 2° and larger angle $\theta b$.

17 Claims, 6 Drawing Sheets

TRANSMISSION LIGHT-SCATTERING LAYER SHEET AND LIQUID CRYSTAL DISPLAY

This application is the national phase under 35 U.S.C. §371 of PCT International Application No. PCT/JP01/02203 which has an International filing date of Mar. 21, 2001, which designated the United States of America.

TECHNICAL FIELD

The present invention relates to a transmittable light-scattering sheet (or film) useful for assuring a high-luminance display of images in a liquid crystal display device (in particular, reflective liquid crystal display device), a method of producing the same, and a reflective liquid crystal display device utilizing the light-scattering sheet.

BACKGROUND ART

The liquid crystal display device (LCD) is utilized broadly in the display segments of personal computers, word processors, LC televisions, chronometers, desktop calculators and other electrical and electronic products. Since the liquid crystal by itself does not emit light, a backlight for illuminating the liquid crystal cell from the back side is used to the exclusion of low-luminance applications such as watches and desktop calculators.

Recent years have witnessed advances in the construction of infrastructures for telecommunications systems such as internets and in the network consolidation of information through the computer-communications equipment integration. By network consolidation, the access to information is freed from restrictions as to time and place. For an efficient utilization of such networks, currently, portable information terminals such as PDA (personal digital assistance) have been developed. Moreover, in lieu of notebook-sized personal computers, further-downsized mobile personal computers of reduced thickness and weight are now under development.

Since portability is required of these portable telecommunications equipment, it is necessary to reconcile the need for a longer battery operating time with the need for reduced thickness and downsizing of communications devices. Therefore, displays for use in such portable telecommunications equipment must be of reduced thickness, reduced weight and low power consumption. Particularly for attaining the low power consumption goal, replacing the conventional liquid crystal display device using a backlight, a reflecting type liquid crystal display device is considered to be most promising as a display for brightening the display screen by exploiting natural light. Further, to keep abreast with the increasing versatility of data accompanying the ever-continuing advances in multimedia, there is a demand for reflecting-mode liquid crystal display apparatus not only capable of color display and high image-quality (high-definition) display in large screen but also of low production cost.

As a reflective liquid crystal display elements constituting the reflecting liquid crystal display device, there is known a variety of elements such as TN (Twisted Nematic) and STN (Super Twisted Nematic) elements, but elements utilizing a polarizer (one polarizing plate type) is preferred for color display and high-definition display. For example, the R-OCB mode in which the liquid crystal layer is of the HAN (hybrid aligned nematic) alignment has excellent characteristics such as low voltage, wider viewing angle, high-speed response, middle color rendition and high contrast.

In order to insure the uniform brightness of the screen as accompanied with getting a display screen of portable equipment larger, the scattering function is an important factor. That is, in the reflective liquid crystal display device, the brightness of the screen is insured in such manner that the light incident on the liquid crystal layer (natural light, ambient light) is efficiently taken in and reflected with a reflector, and the reflected light is scattered to an extent not deteriorating visibility for the prevention of total reflection. When the polarizer and light-scattering sheet are combined, the reflection efficiency can be further improved. Incidentally, as the reflecting plate (reflector), a light-reflecting back electrode system in which an electrode functions as the reflecting plate and a reflecting plate which is disposed on the outside of a support substrate of an electrode can be employed.

For example, concerning reflective liquid crystal display devices, in Japanese Patent Application Laid-Open No. 228887/1988 (JP-63-228887A) and Photofabrication Symposium '92 sponsored by the Japanese Society of Printing, the fundamental technology about liquid crystal display device and the liquid crystal display device given an enlarged viewing angle of the display screen through the prevention of total reflection by means of a surface-corrugated metal thin film as the back electrode (lower electrode) were introduced.

However, when the reflective liquid crystal display device is to be a color display, a color filter is used in addition to the polarizer. In case where a color filter is used, the proportion of loss of reflected light is increased and the above diffusion reflecting plate (scattering plate) system cannot impart enough brightness to the display screen. Particularly, in color display devices, it is important that high luminance is imparted by directed-type scattering in which the scattered light is directed in a given direction. However, in order to enhance the directionality by scattering and reflecting plate system, it is necessary that configuration and distribution of uneven part of the reflecting plate is accurately controlled, and it requires a high cost.

For the purpose of insuring a high luminance by scattering reflected light, there is also known a liquid crystal display device with a transmittable light-scattering sheet in lieu of the diffuse reflecting plate. For example, Japanese Patent Publication No. 8430/1986 (JP-61-8430B) discloses a liquid crystal display device comprising a polarizing layer formed on the front side of a liquid crystal cell and, as formed thereon, a light-scattering layer. Moreover, there is also known a resin sheet polymerized utilizing holography to impart directionality to a transmitting type light-scattering sheet (The synopsis of Lectures at Japanese Society of Liquid Crystal Science, 1998). However, in order to impart directionality to a transmitting type light-scattering sheet by polymerization with utilizing the above holography, complicated method of producing, and as a result, raises the production cost is required.

Meanwhile, known as a light-scattering sheet of low production cost is a particle scattering type sheet comprised of plastic beads and a transparent resin constituting a islands-in-an ocean structure. For example, Japanese Patent Application Laid-Open No. 261171/1995 (JP-7-261171A) discloses a display device having a light-scattering layer externally of a liquid cell, specifically a display device comprising a polarizing film on the outer surface of an electrode plate and, as formed on the surface of the polarizing film, a light-scattering layer comprising a phase separated dispersion of two or more kinds of resins varying in refractive index. Japanese Patent Application Laid-Open No. 27904/1995 (JP-7-27904A) and 113902/1997 (JP-9-113902A) disclose a transmittable liquid crystal display device in which a particulate-scattering sheet having an islands-in-an ocean structure composed of a plastic bead and a transparent resin is disposed between a backlight and a liquid crystal cell. As an example of the display device having a light-scattering layer within the liquid crystal cell, Japanese Patent Application Laid-Open No. 98452/1995 (JP-7-98452A) discloses a display device comprising a transparent resin layer containing a dispersed fine particle (the light scattering layer) between an electrode and a substrate (electrode support substrate) of an electrode plate.

However, in these islands-in-an ocean structure sheets, since the resin beads are dispersed randomly in a transparent resin matrix, the scattering light intensity distributes according to Gaussian distribution in principle. Thus, the directionality can not be imparted to the scattered light, and it is difficult that brightness of the display surface is advanced. Particularly, in respect to the particle dispersed sheet, the brightness of the reflected light from a reflector is increased in the reflective liquid crystal display device having a large display screen, so that the sufficient brightness can not imparted to the periphery of the display screen. On the other hand, the brightness is imparted to the whole display screen to some extent, so that the display screen goes dark as a whole and the visibility is lowered. Therefore, it is difficult in the reflective liquid crystal display device having a relatively large display screen such as a reflective liquid crystal display device having 1.5 inch or more display surface area that the whole display screen is illuminated.

It is, therefore, an object of the present invention to provide a light-scattering sheet (or film) capable of imparting high directionality and diffusibility to a transmitted and scattered light, and a liquid crystal display device (particularly, reflective liquid crystal display device) with the light-scattering sheet.

It is another object of the present invention to provide a light-scattering sheet (or film) capable of illuminating the whole screen, and a liquid crystal display device with the light-scattering sheet (particularly, reflective liquid crystal display device).

It is still another object of the present invention to provide a light-scattering sheet capable of imparting the brightness to the display surface even in large display surface, and a liquid crystal display device (particularly, reflective liquid crystal display device) with the light-scattering sheet.

It is other object of the present invention to provide a light-scattering sheet capable of displaying high quality images sharply and brightly even in color display, and a liquid crystal display device with the light-scattering sheet.

It is further object of the present invention to provide a light-scattering sheet capable of displaying image with high luminance and high definition and a liquid crystal display device with the light-scattering sheet.

It is another object of the present invention to provide a process for producing the light-scattering sheet with ease and at low cost.

DISCLOSURE OF INVENTION

The inventors of the present invention did much research to accomplish the above objects and found that by causing spinodal decomposition under a suitable condition by evaporating or removing a solvent from a homogenous solution containing a plurality of polymers differing in refractive index to form an isotropically droplet phase structure (phase separation structure) having one or two kinds of regularities for an average interphase distance of the droplet phase, and diffusibility and directionality toward one- or two-direction (s) can be imparted to transmitted and scattered light with the use of the sheet having the regular phase separation structure. The present invention has been developed on the basis of the above findings.

Thus, the transmittable light-scattering sheet of the present invention comprises a light-scattering layer composed of a plurality of polymers varying in refractive index and having a droplet phase structure. The light-scattering layer transmits and scatters (or diffuses) an incident light isotropically. The light-scattering layer has a specific characteristic that a maximum value of a scattered light intensity appears at one or two specific scattering angles. That is, the light-scattering layer comprises (1) a light-scattering layer expressing a maximum value of scattered-light intensity at scattering angle of 3 to 40° and (2) a light-scattering layer expressing maximum values of scattered-light intensity at two scattering angles. The latter light-scattering layer has such light-scattering property that maximum values (peaks) of the transmitted and scattered light intensity appear within scattering angle range (that is, the scattering angle range on both sides of the scattering center). In the scattered light intensity, the smaller angle $\theta a$ having a maximum value may be, for example, about 2 to 20°, a ratio $\theta b/\theta a$ of a smaller angle $\theta a$ to a larger angle $\theta b$ having maximum values is, for example, 1.5 to 10. The latter light-scattering layer has at least a droplet or an island-in an ocean phase structure, and a particle size distribution of a dispersed phase in the phase structure has two peaks differing in average particle size. That is, the phase separation structure has a dispersed phase differing in the average particle size, and the layer has two kinds of regularities.

An average diameter of the droplets in the droplet phase structure may be about 0.1 to 20 $\mu$m. An average distance between droplet centers in the droplet phase structure may be about 0.5 to 15 $\mu$m, and a standard deviation of the average distance between droplet centers (average interphase distance) may be not more than 40% of distance between droplet centers. Further, a volume of the droplets in the droplet phase structure may be about 30 to 70% based on the whole light-scattering layer. A total light transmittance of the light-scattering sheet is about 70 to 100%.

A difference between refractive indexes of a plurality of polymers constituting the light-scattering layer is, for example, about 0.01 to 0.2. Moreover, the plurality of polymers can be selected from, for example, a styrenic resin, a (meth)acrylic resin, a vinyl ester-series resins, a vinyl ether-series resin, a halogen-containing resin, an alicyclic olefinic resin, a polycarbonate-series resin, a polyester-series resin, a polyamide-series resin, a silicone-series resin, a cellulose derivative and a rubber or a elastomer. At least one component of the plurality of polymers may be, for example, cellulose esters (e.g., cellulose acetate). The plurality of polymers can comprise a first polymer and a second polymer, and a ratio of the first polymer to the second polymer may be the former/the latter=10/90 to 90/10 (weight ratio).

Such the light-scattering layer having the phase separation structure may be formed by spinodal decomposition, for example, wet spinodal decomposition from a liquid phase comprising a plurality of polymers. In the wet spinodal decomposition, the plurality of polymers which is non-crystalline and soluble in a common solvent [in which a plurality of resins can be dissolved] can be used.

The light-scattering sheet of the present invention may be a sheet solely comprising the light-scattering layer, and may be a laminated sheet which comprises a transparent support and a light-scattering layer laminated on at least one side of the transparent support. In the laminated sheet, the transparent support is usually substantially isotopic under optics.

In a process of the present invention, the light-scattering sheet is produced by removing or evaporating a solvent from a liquid mixture composed of a plurality of polymers varying in refractive index to form the light-scattering layer having at least a droplet phase structure (or the phase separation structure) due to spinodal decomposition. Such process may comprise applying the liquid mixture on the transparent support and removing a solvent in the mixture to form the light-scattering layer or the phase separation structure.

The present invention includes also a reflective liquid crystal display unit which comprises a liquid crystal cell having a liquid crystal sealed therein, a reflecting means for reflecting an incident light disposed behind the liquid crystal cell, and the light-scattering sheet disposed forwardly of the reflecting means. In the unit, a polarizing plate may be disposed forwardly of the liquid crystal cell, and the light-scattering sheet may be disposed between the liquid crystal cell and the polarizing plate.

Throughout this specification, the term "sheet" means, without regard to thickness, a dimensional material thus meaning a film as well.

BEST MODE FOR CARRYING OUT THE INVENTION

Transmittable Light-Scattering Sheet

Figure 1:
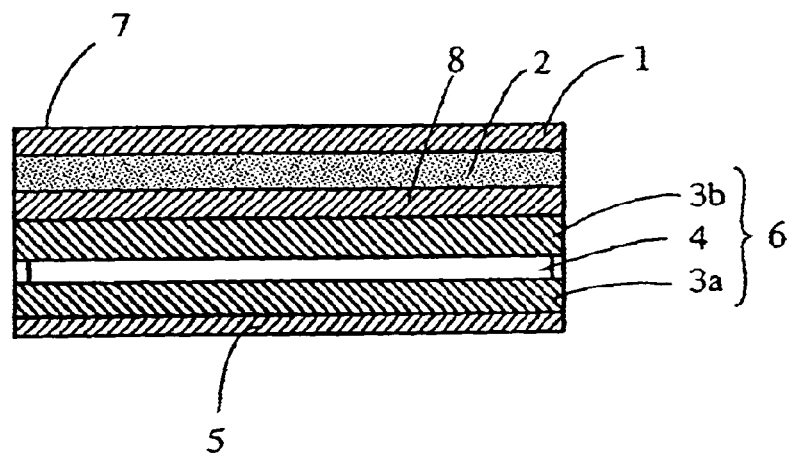
FIG. 1 is a schematic cross-section view showing an example of the liquid crystal display device of the present invention.

A light-scattering layer constituting a transmittable light-scattering sheet comprises a plurality of polymers varying in refractive index, and the light-scattering layer forms a phase separation structure which has at least a droplet phase structure under an atmosphere for use (in particular, a room temperature of about 10 to 30° C.). The light-scattering layer can substantially isotropically scatter an incident light and transmit the incident light, and to a transmitted and scattered light can be imparted high directionality and diffusibility. Particularly, the light-scattering layer forms a phase separation structure which has a specific light-scattering property in respect to a relationship between an intensity of a transmitted and scattered light and a scattering angle. That is, the phase separation structure of the light-scattering layer can scatter the incident light isotropically and can transmit the incident light, and a maximum (peak) of a scattered light intensity appears at one or two specific scattering angles.

To enhance a light-scattering property, a plurality of polymers can be employed in combination so that the refractive index difference is for example about 0.01 to 0.2, and preferably about 0.1 to 0.15. When the refractive index difference is less than 0.01, the intensity of the transmitted and scattered light is deteriorated. When the refractive index difference is more than 0.2, a directionality is unable to be imparted to the transmitted and scattered light.

A plurality of polymers can be suitably in combination selected from styrenic resins, (meth)acrylic resins, vinyl ester-series resins, vinyl ether-series resins, halogen-containing resins, olefinic resins (inclusive of alicyclic olefinic resins), polycarbonate-series resins, polyester-series resins, polyamide-series resins, thermoplastic polyurethane-series resins, polysulfone-series resins (e.g., polyether sulfone, polysulfone), polyphenylene ether-series resins (e.g., a polymer of 2,6-xylenol), cellulose derivatives (e.g., cellulose esters, cellulose carbamates, cellulose ethers), silicone resins (e.g., polydimethyl siloxane, polymethyl phenyl siloxane), rubbers or elastomers (e.g., diene-series rubbers such as polybutadiene and polyisoprene, styrene-butadiene copolymer, acrylonitrile-butadiene copolymer, acrylic rubber, urethane rubber, silicone rubber).

The styrenic resin includes homo- or copolymers of styrenic monomers (e.g. polystyrene, styrene-α-methylstyrene copolymer, styrene-vinyl toluene copolymer) and copolymers of styrenic monomers with copolymerizable monomers (e.g. a (meth)acrylic monomer, maleic anhydride, a maleimide-series monomer, a diene). The styrenic copolymer includes, for example, styrene-acrylonitrile copolymer (AS resin), a copolymer of styrene and a (meth)acrylic monomer [e.g., styrene-methyl methacrylate copolymer, styrene-methyl methacrylate-(meth)acrylate copolymer, styrene-methyl methacrylate-(meth)acrylic acid copolymer], styrene-maleic anhydride copolymer. The preferred styrenic resin includes polystyrene, a copolymer of styrene and a (meth)acrylic monomer [e.g., a copolymer comprising styrene and methyl methacrylate as main component such as styrene-methyl methacrylate copolymer], AS resin, styrene-butadiene copolymer and the like.

As the (meth)acrylic resin, a homo- or copolymer of a (meth)acrylic monomer and a copolymer of a (meth)acrylic monomer and a coplymerizable monomer can be employed. As the (meth)acrylic monomer, there may be mentioned, for example, (meth)acrylic acid; $C_{1-10}$alkyl (meth)acrylates such as methyl (meth)acrylate, ethyl (meth)acrylate, butyl (meth)acrylate, t-butyl (meth)acrylate, isobutyl (meth) acrylate, hexyl (meth)acrylate, octyl (meth)acrylate and 2-ethylhexyl (meth)acrylate; aryl (meth)acrylates such as phenyl (meth)acrylate; hydroxyalkyl (meth)acrylate such as hydroxyethyl (meth)acrylate and hydroxypropyl (meth) acrylate; glycidyl (meth)acrylate; N,N-dialkylaminoalkyl (meth)acrylate; (meth)acrylonitrile; (meth)acrylate having an alicyclic hydrocarbon ring such as tricyclodecane. The copolymerizable monomer includes the above styrenic monomer, a vinyl ester-series monomer, maleic anhydride, maleic acid, and fumaric acid. These monomers can be used singly or in combination.

As the (meth)acrylic resin, there may be mentioned poly (meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, and (meth)acrylate-styrene copolymers (MS resin). The preferred (meth)acrylic resin includes poly($C_{1-6}$alkyl (meth)acrylate) such as poly(methyl (meth)acrylate) and in particular, methyl methacrylate-series resin comprising methyl methacrylate as main component (about 50 to 100% by weight, preferably about 70 to 100% by weight).

The vinyl ester-series resin includes homo- or copolymers of vinyl ester-series monomers (e.g. polyvinyl acetate, polyvinyl propionate), copolymers of vinyl ester-series monomers with copolymerizable monomers (e.g. ethylene-vinyl acetate copolymer, vinyl acetate-vinyl chloride copolymer, vinyl acetate-(meth)acrylate copolymer) and derivatives thereof. The derivative of the vinyl ester-series resin includes polyvinyl alcohol, ethylene-vinyl alcohol copolymer, polyvinyl acetal resin and the like.

As the vinyl ether-series resins, there may be mentioned a homo- or copolymer of vinyl $C_{1-10}$alkyl ether such as vinyl methyl ether, vinyl ethyl ether, vinyl propyl ether, and vinyl t-butyl ether, a copolymer of vinyl $C_{1-10}$alkyl ether and a copolymerizable monomer (e.g. vinyl alkyl ether-maleic anhydride copolymer).

The halogen-containing resin includes polyvinyl chloride, poly(vinylidene fluoride), vinyl chloride-vinyl acetate copolymer, vinyl chloride-(meth)acrylate copolymer, and vinylidene chloride-(meth)acrylate copolymer.

The olefinic resin includes homopolymers of olefins such as polyethylene and polypropylene, copolymers such as ethylene-vinyl acetate copolymer, ethylene-vinyl alcohol copolymer, ethylene-(meth)acrylic acid copolymer and ethylene-(meth)acrylate copolymer. As the alicyclic olefinic resin, there may be mentioned homo- or copolymers of cyclic olefins such as norbornene and dicyclopentadiene (e.g., a polymer having an alicyclic hydrocarbon group such as tricyclodecane which is sterically rigid), copolymers of the cyclic olefin with a copolymerizable monomer (e.g., ethylene-norbornene copolymer, propylene-norbornene copolymer). The alicyclic olefinic resin can be commercially available as, for example, the trade name "ARTON", the trade name "ZEONEX" an the like.

The polycarbonate-series resin includes aromatic polycarbonates based on bisphenols (e.g. bisphenolA) and aliphatic polycarbonates such as diethylene glycol bisallyl carbonates.

The polyester-series resin includes aromatic polyesters obtainable from an aromatic dicarboxylic acid, such as terephthalic acid (homopolyesters, e.g. poly$C_{2-4}$alkylene terephthalates such as polyethylene terephthalate and polybutylene terephthalate, poly$C_{2-4}$alkylene naphthalates and copolyesters comprising a $C_{2-4}$alkylene arylate unit (a $C_{2-4}$alkylene terephthalate unit and/or a $C_{2-4}$alkylene naphthalate unit) as a main component (e.g., not less than 50% by weight). The copolyester includes copolyesters in which, in constituting units of a poly$C_{2-4}$alkylene arylate, a part of $C_{2-4}$alkylene glycols is substituted with a polyoxy$C_{2-4}$alkylene glycol, a $C_{6-10}$alkylene glycol, an alicyclic diol (e.g., cyclohexane dimethanol, hydrogenated bisphenolA), a diol having an aromatic ring (e.g., 9,9-bis(4-(2-hydroxyethoxy)phenyl)fluorene having a fluorenone side chain, a bisphenolA, bisphenolA-alkylene oxide adduct) or the like, and copolyesters which, in constituting units of a part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes polyarylate-series resins, aliphatic polyesters obtainable from an aliphatic dicarboxylic acid such as adipic acid, a homo- or copolymer of a lactone such as ε-caprolactone. The preferred polyester-series resin is usually a non-crystalline polyester such as non-crystalline copolyesters (e.g., $C_{2-4}$alkylene arylate-series copolyesters).

The polyamide-series resin includes aliphatic polyamides such as nylon 46, nylon 6, nylon 66, nylon 610, nylon 612, nylon 11, and nylon 12, a polyamide obtained from a dicarboxylic acid (e.g., terephthalic acid, isophthalic acid, adipic acid) and a diamine (e.g., hexamethylene diamine, m-xylylenediamine). The polyamide-series resin may be homo- or copolymer of a lactam such as ε-caprolactam, and is not limited to a homopolyamide but may be a copolyamide.

Among the cellulose derivatives, the cellulose esters includes, for example, aliphatic organic acid esters (e.g., $C_{1-6}$oraganic acid esters such as cellulose acetates (e.g., cellulose diacetate, cellulose triacetate), cellulose propionate, cellulose butyrate, cellulose acetate propionate, and cellulose acetate butyrate), aromatic organic acid esters (e.g. $C_{7-12}$aromatic carboxylic acid esters such as cellulose phthalate and cellulose benzoate), inorganic acid esters (e.g., cellulose phosphate, cellulose sulfate), and may be mixed acid esters such as acetate nitrate cellulose ester. The cellulose derivatives also includes cellulose carbamates (e.g. cellulose phenylcarbamate), cellulose ethers (e.g., cyanoethylcellulose, hydroxy$C_{2-4}$alkyl celluloses such as hydroxyethylcellulose and hydroxypropylcellulose: $C_{1-6}$alkyl celluloses such as methyl cellulose and ethyl cellulose; carboxymethyl cellulose or a salt thereof, benzyl cellulose, acetyl alkyl cellulose).

The preferred polymer includes, for example, styrenic resins, (meth)acrylic resins, vinyl ester-series resins, vinyl ether-series resins, halogen-containing resins, alicyclic olefinic resins, polycarbonate-series resins, polyester-series resins, polyamide-series resins, cellulose derivatives, silicone-series resins, rubbers or elastomers, and the like. As a plurality of polymers, a resin which is usually non-crystalline and soluble in an organic solvent (in particular, a common solvent in which a plurality of polymers can be dissolved) can be used. In particular, a resin having the excellent moldability, film-forming property, transparent and weather resistance, for example, styrenic resins, (meth)acrylic resins, alicyclic olefinic resins, polyester-series resins, cellulose derivatives (e.g., cellulose esters such as cellulose acetate) are preferred.

A plurality of the polymers can be suitably used in combination. For example, in respect to a combination of a plurality of polymers, a cellulose derivative, in particular, a cellulose ester (e.g., a cellulose $C_{2-4}$alkyl carboxylic acid ester such as cellulose diacetate, cellulose triacetate, cellulose acetate propionate and cellulose acetate butyrate) is employed as at least one resin, and the cellulose derivative may be combined with the other resins.

The glass transition temperature of polymers can be selected within the range of about −100° C. to 250° C., preferably about −50° C. to 230° C., more preferably about 0 to 200° C. (e.g., about 50 to 180° C.). Incidentally, it is advantageous from the viewpoint of strength, rigidity and weather resistance of a sheet that the glass transition temperature of at least one polymer among the constituting polymers is not less than 50° C. (e.g., about 70 to 200° C.), preferably not less than 100° C. (e.g., about 100 to 170° C.). Moreover, from the viewpoint of the moldability of the sheet, the glass transition temperature of the constituting polymers is not more than 250° C. (e.g., about 70 to 200° C.), more preferably not more than 200° C. (e.g., about 80 to 180° C.). The weight-average molecular weight of polymers can be selected within not more than 1,000,000 (e.g., about 10,000 to 1,000,000), preferably about 10,000 to 700,000.

A plurality of polymers can be suitably combined. For example, in dry phase separation process by heating a solid phase containing a plurality of polymers to spinodal decomposition, polymers which are partial-compatible with each other can be combined. While, in wet phase separation process by evaporating or removing a solvent from a liquid phase containing a plurality of polymers to spinodal decomposition, a light-scattering layer which is substantially isotropic and has a regular phase structure can be formed regardless of compatibility of a plurality of polymers in principle. That is why, in wet spinodal decomposition, a combination of a plurality of polymers may be either a compatible combination or an incompatible (phase separable) combination with each other. Usually, for the purpose of controlling a phase separation structure by spinodal decomposition with ease to form a regular phase structure efficiently, a plurality of resins which are not compatible (phase separable) with each other are combined in many cases.

A plurality of polymers can comprise a first polymer and a second polymer in combination. The first and second polymers each may comprise a sole resin or plural resins. The combination of the first and second polymers is not particularly limited. For example, the case of using two kinds of polymers as an example is explained as follows. When the first polymer is a cellulose derivative (e.g., cellulose esters such as cellulose acetate, cellulose acetate propionate), the second polymer may be a styrenic resin (e.g., polystyrene, styrene-acrylonitrile copolymer), a (meth)acrylic resin (e.g., polymethyl methacrylate), a vinyl ester-series resins, an alicyclic olefinic resin (e.g., a polymer formed from norbornene as a monomer), a polycarbonate-series resin, a polyester-series resin (e.g., the above-mentioned poly$C_{2-4}$alkylene arylate-series copolyester) or the like.

The ratio of the first polymer to the second polymer can be selected within the range of, for example, the former/the latter=about 10/90 to 90/10 (weight ratio), preferably about 20/80 to 80/20 (weight ratio), more preferably about 30/70 to 70/30 (weight ratio), particularly about 40/60 to 60/40 (weight ratio). Incidentally, it is advantageous for the purpose of forming the phase separation structure having two maximums (peaks) of a scattered light intensity at two scattering angles that the ratio of the first to second polymers is controlled, and the ratio is approximately equivalent, for example, the first polymer/the second polymer=about 60/40 to 40/60 (weight ratio), preferably about 55/45 to 45/55 (weight ratio). When one polymer is too rich, since the volume ratio of the phases in the phase separation structure is biased, the scattered-light intensity deteriorates. Incidentally, when the sheet comprises three or more polymers, the amount of each polymer can be usually selected within about 1 to 90% by weight (e.g., about 1 to 70% by weight, preferably about 5 to 70% by weight, more preferably about 10 to 70% by weight).

In the transmittable light-scattering sheet of the present invention, the light-scattering layer has at least a droplet phase structure. The droplet phase structure means an islands-in-an ocean structure (independent or isolate phase structure) having an independent phase such as sphere and spheroidal shape. It is sufficient that the light-scattering layer of the present invention has at least a droplet phase structure (droplet or islands-in-an ocean phase separation structure), and also the light-scattering layer may have a droplet phase structure only or the structure such that, for example, the droplet phase structure and a bicontinuous phase structure are intermingled. Configuration of the bicontinuous phase structure is not particularly restricted, and maybe network-like. In the spinodal decomposition, with the progress of the phase separation, the bicontinuous structure is formed. On further proceeding the phase separation, the continuous phase becomes discontinuous owing to its own surface tension to change into the droplet phase structure. In such process of forming phase, the directionality of the scattered light can be imparted by controlling the progress of phase separation in the degree not to gather droplets.

Usually the phase separation structure (droplet phase structure) is substantially isotropic, with diminishing anisotropy within the layer or sheet plane. The term "isotropy" means that a distance between domains (average distance between droplet centers) of the phase separation structure is uniform in all directions within the sheet plane.

The droplet phase structure of the light-scattering layer has a regularity of average distance between droplet centers (average interphase distance). That is why, the light incident on the sheet is directed toward the specific direction by Bragg reflection. Therefore, even though the sheet is provided with a reflective liquid crystal display device, the scattered light can be directed in a given direction (directed-type diffusion) and the display screen can be highly brightened. As a result, the problem unable to be solved by a conventional particle-dispersion type transmittable light-scattering sheet, that is, reflecting a light source configuration (or image) on the panel can be avoided.

In the droplet phase structure, the average particle size (diameter) of droplets (domain) is, for example, about 0.1 to 20 μm, preferably about 0.5 to 15 μm, and more preferably about 1 to 15 μm (particularly about 1 to 10 μm). Moreover, the average distance between droplet centers (average interphase distance) is about 0.5 to 20 μm (e.g., about 1 to 20 μm), preferably about 0.5 to 15 μm (e.g. about 1 to 15 μm), and more preferably about 1 to 10 μm. When the average interphase distance of droplets is too small, the light scatters by farther angle (or large angle) not to obtain a sufficient scattered-light intensity, and when the average interphase distance is too large, the directed direction of the scattered light is almost same as a direction of a linearly advancing light to cause deterioration of light-diffusibility.

Incidentally, in the droplet phase structure, the ratio of the droplet (domain) relative to the whole light-scattering layer can be selected within the range of about 20 to 80 volume %, usually about 30 to 70 volume % (preferably about 40 to 60 volume %).

The phase separation structure of the light-scattering layer expresses in one embodiment, (1) one maximum value at the specific scattering angle, and expresses in the other embodiment, (2) maximum values (peaks) of the scattered-light intensity at two scattering angles (a smaller angle (or near-side angle to the scattering center) and a larger angle (or far-side angle from the scattering center compared with the smaller angle)) in scattering angle range (that is, the scattering angle range on both sides of the scattering center).

The former light-scattering layer (1) has a distribution expressing a large maximum at 3 to 40° (preferably about 5 to 30°, more preferably about 10 to 20°) of scattering angle in the distribution of the scattered-light intensity. In such light-scattering layers having light-scattering property, the standard deviation of the average distance between droplet centers (average interphase distance) is not more than 40% of distance between droplet centers (e.g., about 5 to 40%, preferably about 10 to 30%), and usually about 15 to 30%. When the above standard deviation is too large, the distribution of distance between droplet phases spreads or extends to deteriorate the directionality of the scattered light toward the specific direction.

The latter light-scattering layer (2) has such characteristics that the incident light is substantially isotropically scattered while transmitted, and the layer expresses maximums of the scattered-light intensity at two scattering angles. That is, in a relationship between a scattered-light intensity and a scattering angle, maximums of the scattered-light intensity appear at two scattering angles. Such an optical characteristic is confirmed that the transmitted and scattered-light are observed as double ring when the transmitted and scattered-light is projected to the screen by illuminating light such as laser beam from one side of the sheet.

In the light-scattering layer (2) expressing maximums of the scattered-light intensity at two scattering angles, the maximum at larger angle may peak-like separate from the maximum at smaller angle. In case where a shoulder or flat region appears in the distribution of the scattered-light intensity, the case is also regarded as the distribution having maximum. As for such light-scattering characteristic, it is considered that the phase separation structure has not only a regularity of average distance between domains of the dispersed phase but two kinds of regularities of average distance between domains. In the present invention, the characteristic of light-scattering property or phase separation structure can substantially isotropically scatter and transmit an incident light, and high directionality and diffusibility can be imparted to the transmitted and scattered light.

Further, in the latter light-scattering layer, the first peak of the scattered-light intensity is found in about 2 to 20° of scattering angle θ (smaller angle (or near-side angle) θa), particularly about 2 to 15°, and the second peak of the scattered-light intensity is found in farther angle side (or larger angle side) than the smaller angle. The second peak may be shoulder or flat in the distribution of the scattered-light intensity as described above. Further, in the scattered-light intensity, the ratio of the larger angle θb to the smaller angle θa having maximums, θb/θa is, for example, about 1.5 to 10, preferably about 2 to 8.

Incidentally, the ratio of the scattered-light intensity at smaller angle θa to the scattered-light intensity at larger angle θb is, the former/the latter=about 100/1 to 1/1, preferably about 10/1 to 2/1.

Further, since the light-scattering layer (2) is formed by spinodal decomposition via evaporation of solvent from liquid phase comprising a plurality of polymers (liquid phase such as mixed solution or liquid mixture, and solution in ordinary temperature), it is considered that, in the process of evaporating solvent, the phase separation structure, in which average distance between domains has two kinds of regularities owing to the difference in compatibility of the constituting polymer component with substrate material, is formed. When such transmittable light-scattering sheets are used, the incident light is substantially isotropically scattered and high directionality and diffusibility together can be imparted to the transmitted scattered light.

The light-scattering layer (2) having the phase separation structure has two peaks different in average particle size in a particle size distribution of the dispersed phase (domain). That is, the light-scattering layer (2) has a droplet phase structure having two kinds of distributions different in size in the particle size distribution. Moreover, it is considered that the phase separation structure has a regularity of inter-phase distance (distance between the same phases). That is, in the phase separation structure, it is considered that a plurality of polymers regularly cause the phase separation with two different average interphase distances. Incidentally, it is considered that average distance between droplet phases having a large average particle size expresses the scattering peak at the smaller angle, and that average distance between droplet phases having a small average particle size gives the scattering peak of the larger angle.

The average particle size of a large-sized dispersed phase (domain) may be, for example, about 3 to 20 μm, preferably about 5 to 15 μm, more preferably about 7 to 15 μm, and the average particle size of a small-sized dispersed phase (domain) may be, for example, about 0.1 to 5 μm, preferably about 0.5 to 4 μm, more preferably about 1 to 3 μm. Incidentally, the average particle size of dispersed phase (domain) as a whole is, for example, about 0.1 to 20 μm, preferably about 1 to 15 μm, more preferably about 1 to 10 μm.

The ratio of the average particle size of a large-sized dispersed phase (domain) to that of a small-sized dispersed phase (domain) is, the former/the latter=about 100/1 to 1.5/1, preferably about 50/1 to 2/1, more preferably about 25/to 3/1 (e.g., 10/1 to 3/1).

The average interphase distance of a large-sized dispersed phase (domain) is, for example, about 5 to 20 μm, preferably about 7 to 15 μm (e.g., about 7 to 12 μm), and the average interphase distance of a small-sized dispersed phase (domain) is, for example, about 0.5 to 10 μm, preferably about 1 to 8 μm (e.g., about 2 to 8 μm). Incidentally, the average interphase distance of dispersed phase (droplet phase or domain) as a whole is, for example, about 0.5 to 20 μm (e.g., about 1 to 20 μm), preferably about 1 to 15 μm (e.g., about 1 to 10 μm).

Incidentally, a center position of the droplet (domain) can be calculated by regarding the droplet as uniform object. Throughout this specification, the term "distance between droplet centers (interphase distance)" means a distance between the center positions of droplets adjacent to each other. Incidentally, the average distance (average interphase distance) between droplet centers and its standard deviation can be determined by processing images (for example, with the use of "Image Analyzer V10" manufactured by Toyo Boseki Co. Ltd.) of a photomicrograph (e.g., a transmission microscope, a phase-contrast microscope, a confocal laser microscopic picture) of the light-scattering layer or transmittable light-scattering sheet, measuring and calculating. An alternative method comprises measuring the scattering angle θ having a maximum intensity of scattered light by the same procedure as one for evaluating the directionality of scattered light described hereinafter and calculating the average interphase distance d of the droplets based on the following Bragg reflection equation.

$$2d \cdot \sin(\theta/2) = \lambda$$

wherein d denotes an average interphase distance of droplets, θ denotes a scattering angle, and λ denotes a wavelength of light.

Although a forming mechanism of the phase separation structure (2) is not clarified, when, for example, phase separation is formed by wet spinodal decomposition which comprises applying a solution containing a plurality of polymers on a substrate and evaporating a solvent, it is considered that average distance between domains of the phase separation structure has two kinds (two ways) of regularities owing to the difference in compatibility of the constituting polymer component with substrate material. That is why, the light incident on the sheet has maximums of the scattered-light intensity at two (plural) specific angles according to different average interphase distances by Bragg reflection. Therefore, even though the sheet is provided with a reflective liquid crystal display device, the scattered light can be directed in a given direction (directed-type diffusion) and the display screen can be highly brightened. As a result, the problem unable to be solved by a conventional particle-dispersion type transmittable light-scattering sheet, that is, reflecting a configuration (or image) of light source (e.g., fluorescent lamp) on the panel can be avoided. Since the scattering peak at larger angle can realize scattering over wide angle range, the uniform brightness of a display screen can be insured. Particularly, even though a reflective liquid crystal display device has a large screen, the brightness of the screen is insured.

Figure 2:
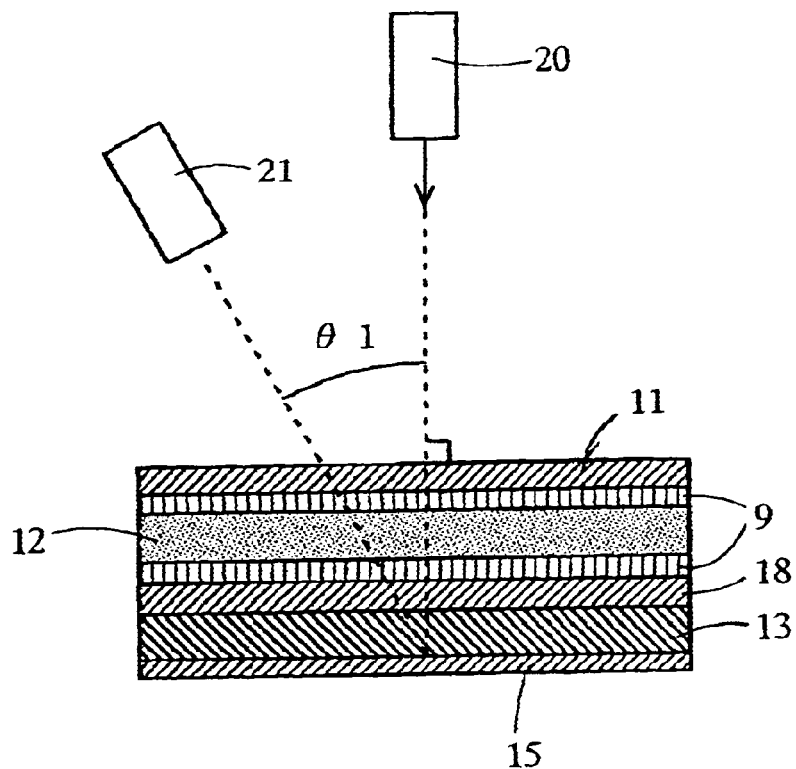
FIG. 2 is a schematic view explaining an evaluation method for a directionality of a light-scattering sheet.

The transmittable light-scattering sheet of the present invention can highly direct the scattered light, and the scattered light can be diffused over wide angle range. The directionality of scattered light can be measured, for example, as shown in FIG. 2, by using a model of a reflecting type liquid crystal display device comprising a laminated sheet composed of a polarizing plate (polarizer) 11, the a light-scattering sheet 12, a color filter 18 in this order with the use of a vinyl acetate adhesive 9, glass plate (thickness: 1 mm) 13 and an aluminum reflecting plate (aluminum reflector) 15. The polarizing plate 11 is situated on the front side of the model of device, and the aluminum reflecting plate 15 is situated on the back side of the model of device. Thus, by illuminating the model of reflective liquid crystal display device perpendicularly from the direction of the front surface using a laser beam illuminator (manufactured by NIHON KAGAKU ENG NEO-20 MS) 20 and detecting the reflected-light intensity (scattered-light intensity) at the scattering angle θ1 by detector 21, the intensity distribution of reflected light (the distribution of scattered light) is measured.

Compared with the light-scattering sheet having a Gaussian distribution centered around θ1=0°, in contrast, the transmittable light-scattering sheet provided with the light-scattering layer (1) shows an intense maximum distribution of scattered light in the directed direction (scattering angle θ1=3 to 40°, preferably 5 to 30°, more preferably 10 to 20°), and scattered light can be diffused over wide angle range. Moreover, the transmittable light-scattering sheet provided with the light-scattering layer (2) shows an intense maximum distribution of scattered light in the directed direction (scattering angle θ1=2 to 40°, preferably 2 to 25°, more preferably 2 to 20°), and scattered light can be diffused over wide angle range.

Figure 3:
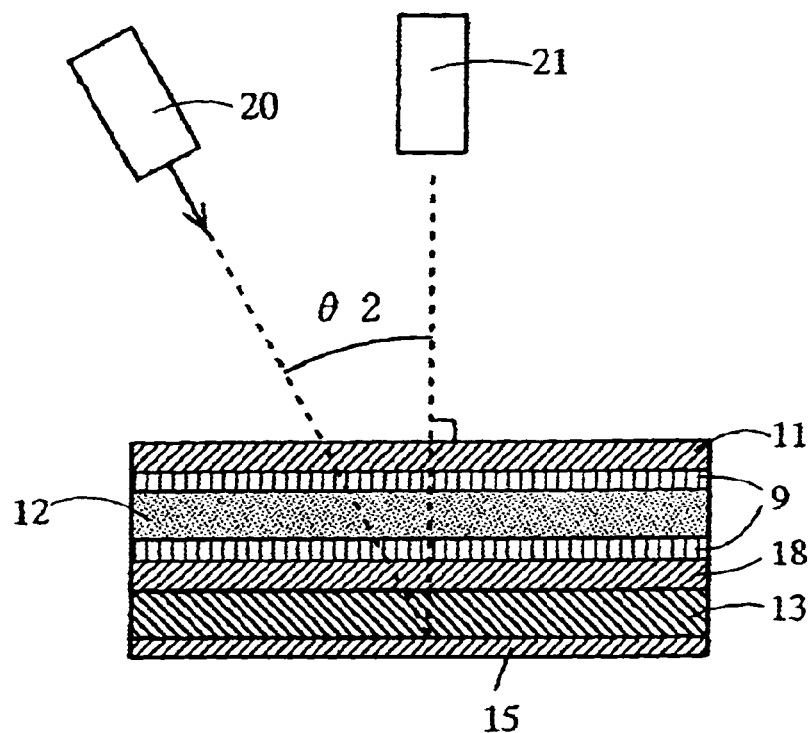
FIG. 3 is a schematic view explaining a method of measuring a reflecting-light intensity by incident light from oblique direction.

The brightness of the display surface by incident light from oblique direction can be evaluated with the use of the model of the device such as the device shown in FIG. 3. That is, by illuminating the model of reflective liquid crystal display device from oblique direction of its front surface with angle θ2 using a laser irradiating unit (manufactured by NIHON KAGAKU ENG NEO-20 MS) 20 and detecting the intensity of reflected-light which emerges perpendicularly from the front side by detector 21, the intensity of reflected light by incident light from oblique direction is measured.

Figure 4:
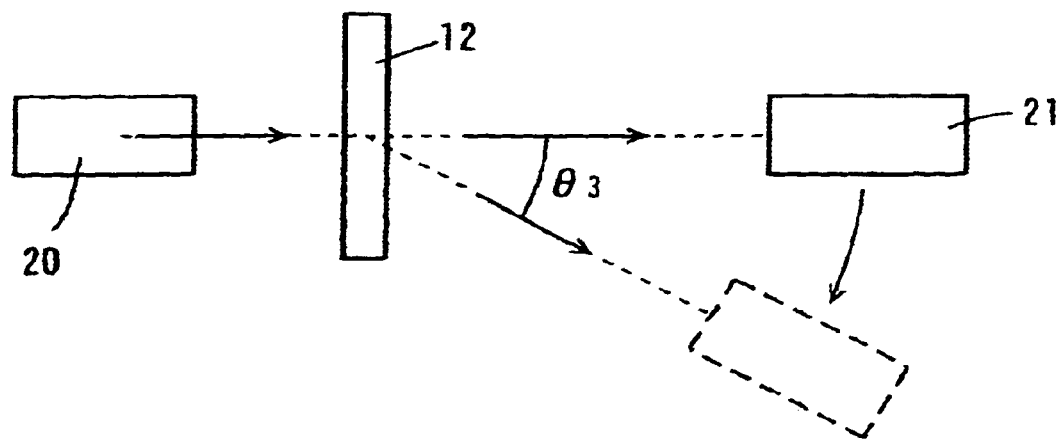
FIG. 4 is a schematic view explaining a measurement method for a transmitted scattering-light intensity in the light-scattering sheet.

Further, in the light-scattering sheet, a relationship between a light-scattering intensity and a scattering angle can be measured with the use of the device shown in FIG. 4 (a schematic view explaining a measurement method for scattering-light intensity). That is, laser beam is irradiated toward light-scattering sheet 12 by laser irradiating unit (or laser beam irradiator) (manufactured by NIHON KAGAKU ENG NEO-20 MS) 20 disposed on back surface of light-scattering sheet 12. Laser beam is transmitted through light-scattering sheet 12 with diffused, and emerges from the front of light-scattering sheet 12. The scattered-light intensity can be measured by detecting the scattered-light intensity at the scattering angle θ3 with detector 21. As such measuring devices, laser beam scattering automatic measuring device (manufactured by Nihon Kagaku Engineering Co. Ltd.) can be used.

The total light transmittance (transparency) of the light-scattering sheet is, for example, about 70 to 100%, preferably about 80 to 100%, more preferably about 90 to 100%. Incidentally, the total light transmittance value can be measured by a hazemeter (manufactured by Nippon Densyoku Kogyo Co. Ltd., NDH-300A).

Incidentally, the light-scattering sheet may comprise a light-scattering layer alone, and may be a laminated sheet which comprises a transparent support (a substrate sheet or film) and a light-scattering layer laminated on at least one side of the transparent support. The lamination of the light-scattering sheet and the support makes a sheet strength enhanced.

As a resin constituting the transparent support (substrate sheet), the resin similar to that of the light-scattering layer can be used. As the preferred resin constituting the transparent support, there may be mentioned, for example, cellulose derivatives (e.g., a cellulose acetate such as cellulose triacetate (TAC) and cellulose diacetate), polyester-series resins (e.g., polyethylene terephthalate (PET). polybutylene terephthalate (PBT), polyarylate-series resins), polysulfone-series resins (e.g., polysulfone, polyether sulfone (PES)), polyether ketone-series resins (e.g., polyether ketone (PEK), polyether ether ketone (PEEK)), polycarbonate-series resins (PC), polyolefinic resins (e.g., polyethylene, polypropylene), a cyclic polyolefinic resins (e.g., ARTON, ZEONEX), halogen-containing resins (e.g., polyvinyl chloride, polyvinylidene chloride), (meth)acrylic resins, styrenic resins (e.g., polystyrene), vinyl ester or vinyl alcohol-series resins (e.g., polyvinyl alcohol). The transparent support may be stretched monoaxially or biaxially, and the transparent support having an optical isotropy is preferred. The preferred transparent support is a support sheet or film having low birefringence. The optically isotropic transparent support includes non-stretched sheet or film, and includes a sheet or film composed of, for example, polyesters (e.g., PET, PBT), cellulose esters, in particular cellulose acetates (e.g., cellulose acetate such as cellulose diacetate and cellulose triacetate, $C_{3-4}$alkylcarboxylic acid ester of cellulose acetate such as cellulose acetate propionate and cellulose acetate butyrate) or the like. Cellulose triacetate sheet or film having low birefringence is preferred based on its technical achievement as protection film of a LCD-use polarizing plate.

The thickness of the light-scattering layer or the light-scattering sheet may be, for example, about 0.5 to 300 μm, preferably about 1 to 100 μm (e.g., about 10 to 100 μm), more preferably about 1 to 50 μm (e.g., about 5 to 50 μm), particularly about 1 to 30 μm (e.g., about 10 to 30 μm). When the sheet is too thin, the scattered-light intensity deteriorates, and when the sheet is too thick, the light-scattering property is too strong and the directionality deteriorates. Moreover, in case where the light-scattering layer or the light-scattering sheet is applied to the reflection mode liquid crystal display device, not only the thickness or weight of the device increases but displayed image grows dim and definition of the display screen is deteriorated. Incidentally, when the difference between the refractive indexes of polymers is small, the thickness of the sheet is preferably larger, and in contrast when the difference between the refractive indexes of polymers is large, the thickness of the sheet is preferably smaller. Incidentally, when the light-scattering sheet comprises the transparent support and the light-scattering layer, the thickness of the light-scattering layer may be, for example, about 1 to 100 $\mu$m, preferably about 1 to 50 $\mu$m (e.g., about 5 to 50 $\mu$m), more preferably about 1 to 30 $\mu$m (e.g., about 10 to 30 $\mu$m), and even in the thickness of about 1 to 15 $\mu$m, high light-scattering property is usually obtained.

Incidentally, the light-scattering layer or the light-scattering sheet of the present invention may be laminated on, for example, a member constituting a liquid crystal display device (in particular, an optical member) such as a polarizing plate or an optical retardation plate for coloration and high definition of a liquid crystal image, if necessary.

Incidentally, the light-scattering sheet may contain a variety of additives, for example, a stabilizer (e.g. antioxidant, ultraviolet absorber, heat stabilizer, etc.), a plasticizer, a colorant (a dye or a pigment), a flame retardant, an antistatic agent and a surfactant. Moreover, where necessary, the surface of the light-scattering sheet may be formed with various coating layers, such as an antistatic layer, an antifogging layer and a parting (release) layer, if necessary.

[Method of Producing a Transmittable Light-scattering Sheet]

The transmittable light-scattering sheet of the present invention can be produced by a variety of spinodal decomposition methods, for example, which comprise molding a resin composition composed of a plurality of polymers differing in refractive index with each other into a sheet, and fixing or immobilizing a phase separation structure caused due to spinodal decomposition to form an isotropic droplet phase structure. As the sheet-molding method, for example, such a casting or coating method as casting or coating a solution (or slurry) of the resin composition are utilized. In the method, the isotropic droplet phase structure may be formed by conducting spinodal decomposition while molding a sheet.

As a method of producing a light-scattering sheet by spinodal decomposition, there are exemplified wet spinodal decomposition method, that is a method comprising evaporating or removing a solvent from a liquid mixture containing a plurality of polymers differing in refractive index with each other to form a phase separation structure which is substantially isotropic due to spinodal decomposition. The liquid mixture containing a plurality of polymers is usually used as a solution in which the polymers are dissolved in a common solvent (in particular, homogenous solution).

Incidentally, in the wet spinodal decomposition method, the light-scattering layer having the above phase separation structure can be formed regardless of compatibility of the constituting polymers in principle. Thus, the method can be effectively adopted to a polymer system which can not be adopted to the dry spinodal decomposition method, for example, the constituting polymers which are incompatible with each other by kneading at a temperature of not more than decomposition temperature of the polymers. The above common solvent can be selected from solvents capable of dissolving each polymer according to the species and the solubility of the polymers, and may be, for example, water, an alcohol (e.g., ethanol, isopropanol, butanol, cyclohexanol), an aliphatic hydrocarbon (e.g., hexane), an alicyclic hydrocarbon (e.g., cyclohexane), an aromatic hydrocarbon (e.g., toluene, xylene), a halogenation hydrocarbon (e.g., dichloromethane, dichloroethane), an ester (e.g., methyl acetate, ethyl acetate, butyl acetate), an ether (e.g., dioxane, tetrahydrofurane), a ketone (e.g., acetone, methyl ethyl ketone, methyl isobutyl ketone), a cellosolve (e.g., methyl cellosolve, ethyl cellosolve), a cellosolve acetate, a sulfoxide (e.g., dimethyl sulfoxide), an amide (e.g., dimethylformamide, dimethylacetoamide), and the solvent may be a mixed solvent.

The concentration of a solute (polymer) in liquid mixture can be selected within the range causing the phase-separation and not deteriorating castability and coating property, and is, for example, about 1 to 40% by weight, preferably about 2 to 30% by weight (e.g., about 2 to 20% by weight), more preferably about 3 to 15% by weight (e.g., about 5 to 15% by weight), and is usually about 5 to 25% by weight. When the concentration of polymers is too high, it is difficult to control the phase separation. When the concentration of polymers is too low, the casting or coating property tends to be deteriorated.

After the liquid mixture is cast or coated, a spinodal decomposition can be carried out by evaporating or removing a solvent at a temperature of less than a boiling point of the solvent (e.g., a temperature lower than a boiling point of the solvent by about 1 to 120° C., preferably about 5 to 50° C., in particular about 10 to 50° C.) to cause the phase separation of a plurality of polymers to spinodal decomposition. The removal of the solvent can be usually carried out by drying, for example drying at an temperature of about 30 to 100° C., preferably about 40 to 80° C. according to the boiling point of the solvent.

The phase separation structure formed by spinodal decomposition can be fixable by cooling to a temperature of not more than a fixing temperature or a glass transition temperature of the constituting polymer (e.g., not more than a glass transition temperature of the main polymer).

The phase separation structure can be formed by a simple operation of removal and dryness of a solvent without heating treatment at high temperature because of utilizing spinodal decomposition by removing a solvent.

In the method, for example, it is considered that the formation of the phase separation structure is influenced by many factors such as a composition ratio of a plurality of polymers, kinds of solvent, and a compatibility with support substrate. For example, when the ratio of the first polymer (e.g., cellulose ester) to the second polymer (e.g., copolyester) is adjusted, the specific phase separation structure (e.g., light-scattering layer expressing the maximum intensity of scattered-light at the above two scattering angles) is formed, since the compatibility with the support substrate on which the above mixture is applied is different according to the plural polymer components and various factors seems to influence. More concretely, the light-scattering sheet composed of the light-scattering layer alone can be produced by casting the liquid mixture on a release support, evaporating a solvent in the liquid mixture to cause phase separation due to spinodal decomposition, forming and fixing the light-scattering layer having the phase separation structure, and peeling the light-scattering layer from the release support. Moreover, the light-scattering sheet comprising the transparent support (e.g., transparent substrate sheet) and the light-scattering layer can be produced by coating the liquid mixture on the transparent support, evaporating a solvent in liquid mixture to cause phase separation due to spinodal decomposition, forming the phase separation structure, and fixing the structure, or by laminating the light-scattering layer on the transparent support (transparent substrate sheet) by means of a laminate method such as adhesion.

Incidentally, the liquid mixture is coated on a transparent support, and the transparent support sometimes dissolves or swells according to the species of solvents. For example, when a coating liquid (homogenous solution) containing a plurality of resins is coated on triacetylcellulose film, the coating surface of triacetylcellulose film sometimes elutes, corrodes, or swells according to the species of solvents. In this case, it is advantageous that a coating surface of the transparent support (e.g., triacetylcellulose film) is previously applied with a coating agent for solvent resistance to form an optically isotropic coating layer for solvent resistance. Such a coating layer can be formed with, for example, an isotropic polymer resin excellent in solvent resistance [e.g., thermoplastic resins such as polyacrylonitrile-series resins (e.g., AS resin), polyester-series resins, polypropylene resins, and polyvinyl alcohol-series resins (e.g., polyvinyl alcohol, ethylene-vinyl alcohol copolymer) and silicone-series resins, epoxy resins, crosslinked silicone-series resins, melamine-series resin], setting resins such as heat or ultraviolet-curable resins, hard-coating agents, inorganic coat layers which can be formed by methods such as a vacuum film-forming method (e.g., vapor deposition, sputtering) and a method comprising coating an inorganic materials and baking. Incidentally, as hard-coating agents, there are exemplified polymer resins such as epoxy resins, acrylic resins, and silicone-series resins, inorganic compounds such as metal oxides, glasses and ceramics. As the preferred coating layer for solvent resistance, there is exemplified the coating layer comprising polyvinyl alcohol-series resin (e.g., polyvinyl alcohol, ethylene-vinyl alcohol copolymer) which can be easily coated by a coater.

Incidentally, when a liquid mixture or coating liquid containing a plurality of polymers is coated on a transparent support, a solvent in which the transparent support does not dissolve, corrode or swell may be selected according to the species of the transparent support. For example, when triacetylcellulose film is employed as the transparent support, tetrahydrofuran, methyl ethyl ketone or the like is used as a solvent for the liquid mixture or the coating liquid and thus the light-scattering layer can be formed without deteriorating properties of the film.

[Liquid Crystal Display Device]

The transmittable light-scattering sheet of the present invention is applied to a reflective liquid crystal display device equipped with a reflecting means, in particular, a reflective liquid crystal display device equipped with a reflecting means and a polarizing means. For example, the liquid crystal display device is not limited to a one polarizing plate-type reflective LCD device with one polarizing plate, and may be a two polarizing plates-type reflective LCD device with two polarizing plates varying in polarizing property. The reflective LCD device utilizing one polarizing plate may be a reflective LCD device combining one polarizing plate with a variety of modes (e.g. the mode using a twisted nematic liquid crystal, a R-OCB (optically compensated bend) mode, a parallel alignment mode, etc.).

Moreover, the light-scattering sheet of the present invention can be also applied to a reflective LCD device utilizing the wavelength selectivity in the reflection property of a chiral nematic liquid crystal.

FIG. 1 is a schematic cross-section view showing an example of the reflective LCD device. This LCD device comprises a liquid crystal cell 6 having a liquid crystal (e.g., liquid crystal layer) 4 sealed between a pair of transparent substrates (e.g., glass plate, plastic) 3a, 3b, a reflecting means (e.g., a reflective layer such as specular reflecting plate) 5 laminated on one transparent substrate (back substrate) 3a of the transparent substrates 3 constituting the liquid crystal cell, a light-scattering sheet 2 laminated on the other transparent substrate (front substrate) 3b constituting the liquid crystal cell 6 via a coloring means for color display (e.g., a color filter) 8, and a polarizing means (e.g. a polarizing layer such as polarizing plate) 1 for polarizing a light reflected by the reflecting means 5, which is laminated on the light-scattering sheet. Transparent electrodes (not shown) are formed on the opposed surfaces of the pair of transparent substrates 3a and 3b.

In such a reflective LCD device, a light incident from a front surface 7 on the viewer side (a incident light) is diffused through the light-scattering sheet and reflected by the reflecting means 5, and the reflected light is rescattered through the light-scattering sheet 2. Particularly, the transmitted and scattered light has the directionality. That is why, in the reflective LCD device having the light-scattering sheet 2, the reflection light can be scattered with high light-scattering property and the reflection light intensity can be directed toward the predetermined direction. Therefore, the display screen can be lightened, the sufficient brightness can be ensured even in color display, and the sharp color image can be realized in the color display-type reflective LCD device.

Incidentally, in the liquid crystal display device, the position for disposing the light-scattering sheet is not particularly limited as far as a reflecting means for reflecting an incident light toward back side of the liquid crystal cell is disposed and the light-scattering sheet is disposed forwardly of the reflecting means. Moreover, it is sufficient that the polarizing plate may be disposed on a light path (incident path and emerge path) The position for disposing the polarizing means and the light-scattering sheet is not particularly limited and the light-scattering sheet may be disposed forwardly of the polarizing means. In the preferred embodiment, in order to illuminate a display screen by the polarizing means, the polarizing plate is disposed forwardly of the liquid crystal cell, and the light-scattering sheet is disposed between the liquid crystal cell and the polarizing plate.

The reflecting means can be formed with a thin film such as vapor deposition film made of aluminum, and a transparent substrate, a color filter, a light-scattering sheet, and a polarizing plate may be laminated with an adhesive layer. That is, the light-scattering sheet of the present invention may be used with laminating the other functional layer (e.g., a polarizing plate, an optical retardation, light-reflecting plate, a transparent conductive layer). Incidentally, when the reflective LCD device is employed as a monochrome display device, the above color filter is not always required.

Moreover, an optical retardation plate may be disposed in an STN (Super Twisted Nematic) liquid crystal display device, though this is not indispensable in a TFT liquid crystal display device. The optical retardation plate may be disposed on a suitable position, for example, between the front transparent substrate and the polarizing plate. In this device, the light-scattering sheet may be interposed between the polarizing plate and the optical retardation plate, and may be interposed between the front transparent substrate and the optical retardation plate.

By using the light-scattering sheet of the present invention, since high light-scattering property and directionality can be imparted to the reflection light, the visibility of the liquid crystal display device can be advanced. In particular, even when a surface area of the liquid crystal display is large, the highly brightness can be realized throughout the display surface. Therefore, the LCD device can be utilized broadly in the display segments of electrical and electronic products such as personal computers, word processors, liquid crystal televisions, cellular phone, chronometers, desktop calculators. Especially, it is preferably utilized in a liquid crystal display device of a portable information terminal.

Industrial Applicability

According to the present invention, since the light-scattering layer has the specific phase separation structure, not only the high directionality but also the light-scattering property can be imparted to a transmitted and scattered light, the whole screen can be brightly displayed. That is why, even in a color display unit having large display surface area, the display screen can be illuminated highly. Therefore, the transmitted light-scattering sheet of the present invention is preferably applied to a reflective liquid crystal display device, in particular, a colored liquid crystal display device for portable information terminals. Further, even in a colored reflective liquid crystal display device, the display screen can be displayed with high image-quality, vividness and brightness, and a display of a high definition and high luminance can be realized. Furthermore, according to the method of the present invention, the transmittable light-scattering sheet having the substantially isotropic phase separation structure can be produced with the use of spinodal decomposition of the liquid phase at low cost.

EXAMPLES

The following examples are intended to describe this invention in further detail and should by no means be interpreted as defining the scope of the invention.

Example 1

Cellulose acetate (3 parts by weight) (acetylation degree:55.0%, polymerization degree:300, manufactured by Daicel Chemical Industries, Ltd., HDP) and 3 parts by weight of polymethyl methacrylate (PMMA, manufactured by Mitsubishi Rayon Co. Ltd., BR-80) were dissolved in 94 parts by weight of acetone. The solution was cast on a glass plate with the use of wire bar #40, and the plate was allowed to stand in an oven at a temperature of 30° C. for 3 minutes, and then acetone was evaporated to form a sheet layer having thickness of 5 $\mu$m on the glass plate. The sheet was peeled from the glass plate. When the sheet was observed with a transmission optical microscope, the sheet was found to have a regular droplet phase structure.

When images of the transmission optical microscope photograph was analyzed with the use of "Image Analyzer V10" (manufactured by Toyo Boseki Co. Ltd.) to measure average diameter of droplets and average distance (average interphase distance) between centers of droplets, the average interphase distance of droplet phases was 3.9 $\mu$m, the standard deviation for the average interphase distance was 20%, and the average diameter of the droplets was 2.8 $\mu$m. Moreover, the occupied ratio of droplet part was 50 volume % relative to the sheet. Further, when the total light transmittance (transparency) of the sheet was measured by a hazemeter (manufactured by Nippon Densyoku Kogyo Co. Ltd., NDH-300A) in accordance with JIS K7105, the total light transmittance was 90%.

Example 2

Cellulose acetate (3 parts by weight) (acetylation degree:55.0%, polymerization degree:300, manufactured by Daicel Chemical Industries, Ltd., HDP) and 3 parts by weight of polymethyl methacrylate (PMMA, manufactured by Mitsubishi Rayon Co. Ltd., BR-80) were dissolved in 94 parts by weight of acetone. As a transparent support, a coated film in which the surface of triacetylcellulose film (thickness:50 $\mu$m) was coated with polyvinyl alcohol (manufactured by Kurare Co. Ltd., alkyl-modified PVA MP203, saponification degree:88%) was used. The solution was cast on the coated-side of the triacetylcellulose film, and the cast film was allowed to stand in an oven at a temperature of 20° C. for 3 minutes, and then acetone was evaporated to form a coating layer (light-scattering layer) having thickness of 3 $\mu$m. When the light-scattering layer was observed with a transmission optical microscope, the sheet was found to have a regular droplet phase structure, the average interphase distance of the droplet phase was 4.3 $\mu$m, the standard deviation for the average interphase distance was 24%, and the average diameter of the droplet was 3.4 $\mu$m. Moreover, the occupied ratio of droplet part was 50 volume % relative to the light-scattering layer. Further, the total light transmittance of the sheet was 91%.

Example 3

Cellulose acetate (3 parts by weight)(acetylation degree:54.6%, polymerization degree:180, manufactured by Daicel Chemical Industries, Ltd., VFY) and 4 parts by weight of polymethyl methacrylate (PMMA, manufactured by Mitsubishi Rayon Co. Ltd., BR-80) were dissolved in 93 parts by weight of acetone. As a transparent support, a coated film in which the surface of triacetylcellulose film (thickness:50 $\mu$m) was coated with polyvinyl alcohol (manufactured by Kurare Co. Ltd., alkyl-modified PVA MP203, saponification degree:88%) was used. The solution was cast on the coated-side of the triacetylcellulose film, and the cast film was allowed to stand in an oven at a temperature of 20° C. for 3 minutes, and then acetone was evaporated to form a coat layer (light-scattering layer) having thickness of 2 $\mu$m. When the light-scattering layer was observed with a transmission optical microscope, the sheet was found to have a regular droplet phase structure, the average interphase distance of the droplet phase was 4.1 $\mu$m, and the standard deviation for the average interphase distance was 19%. Moreover, the average diameter of the droplet was 3.3 $\mu$m, the occupied ratio of droplet part was 45 volume % relative to the light-scattering layer. Further, the total light transmittance of the sheet was 92%.

Comparative Example 1

Cellulose triacetate (70 parts by weight) (manufactured by Daicel Chemical Industries, Ltd., LT-105) was dissolved in 90 parts by weight of a mixed solvent of methylene chloride/methanol (9/1; weight ratio). To the above solution was mixed 30 parts by weight of fine particles of crosslinked polymethyl methacrylate (PMMA) (manufactured by Sekisui Kagaku Co. Ltd., MBX-2), and the solution was cast to obtain 100 $\mu$m of sheet. When the obtained sheet was observed with a transmission optical microscope, the sheet was found to have a random droplet phase structure. The average diameter of the droplet was 3.0 $\mu$m, and the total light transmittance of the sheet was 92%.

Figure 5:
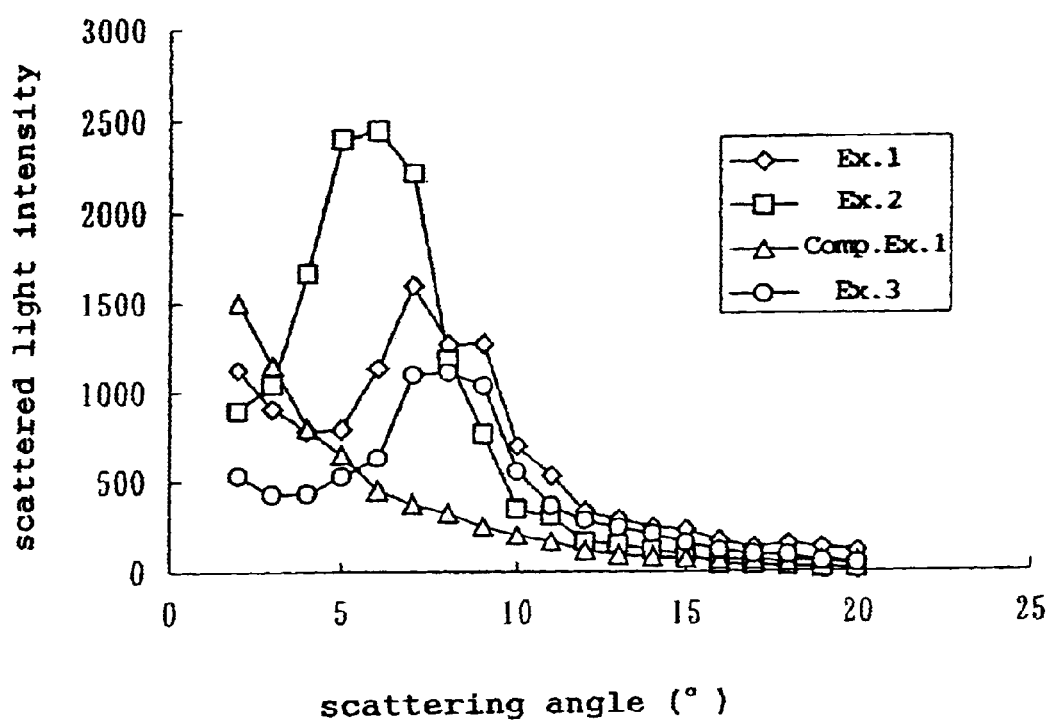
FIG. 5 is a graph showing a relationship between a light-diffusion intensity and a scattering angle (2 to 20°) in Examples 1 to 3 and Comparative example 1.

[Evaluation of Light-scattering Property]
(1) Light-transmitting and Scattering Property of Light-scattering Sheet In the light-scattering sheets obtained Examples 1 to 3 and Comparative example 1, a relationship between a light-scattering intensity and a scattering angle was determined by projecting light from a normal (perpendicular) direction with laser beam scattering automatic measuring device (manufactured by Nihon Kagaku Engineering Co. Ltd.) as shown in FIG. 4. The result was shown in FIG. 5. As apparent from FIG. 5, while the scattering light intensity showed Gaussian distribution in the sheet of Comparative example 1 in which the droplet phase structure randomly distributed, in the sheets of Examples, the scattered light was directed toward specific angles (7° in Example 1, 6° in Example 2, 8° in Example 3).

(2) Brightness of Display

Reflecting type LCD model units shown in FIG. 3 was constructed with the use of the light-scattering sheet obtained in Examples 1 to 3 and comparative Example 1. Each unit was illuminated with a white spot light from an oblique and upper direction at an angle of incidence (scattering angle or diffusion angle θ2) and the intensity of reflected light emerged in a perpendicular direction from the front side was measured as shown in FIG. 3. The intensity of reflected light in the perpendicular direction for the angle of incidence (scattering angle θ2) was evaluated according to the following criteria. The results are shown in Table 1.

◎: considerably bright
○: bright
Δ: normal to dark

TABLE 1

| Diffusion Angle (θ2) | Example 1 | Example 2 | Example 3 | Comparative Example 1 |
|---|---|---|---|---|
| 5° | ◎ | ◎ | ○ | Δ |
| 10° | ◎ | ◎ | ◎ | Δ |
| 15° | ○ | Δ | ○ | Δ |
| 20° | ○ | Δ | ○ | Δ |
| 25° | Δ | Δ | Δ | Δ |

As apparent from Table 1, in the transmittable light-scattering sheets of Examples 1 to 3, the reflection-light intensities at the specific scattering angles were strong, and had high directionalities.

Example 4

Figure 6:
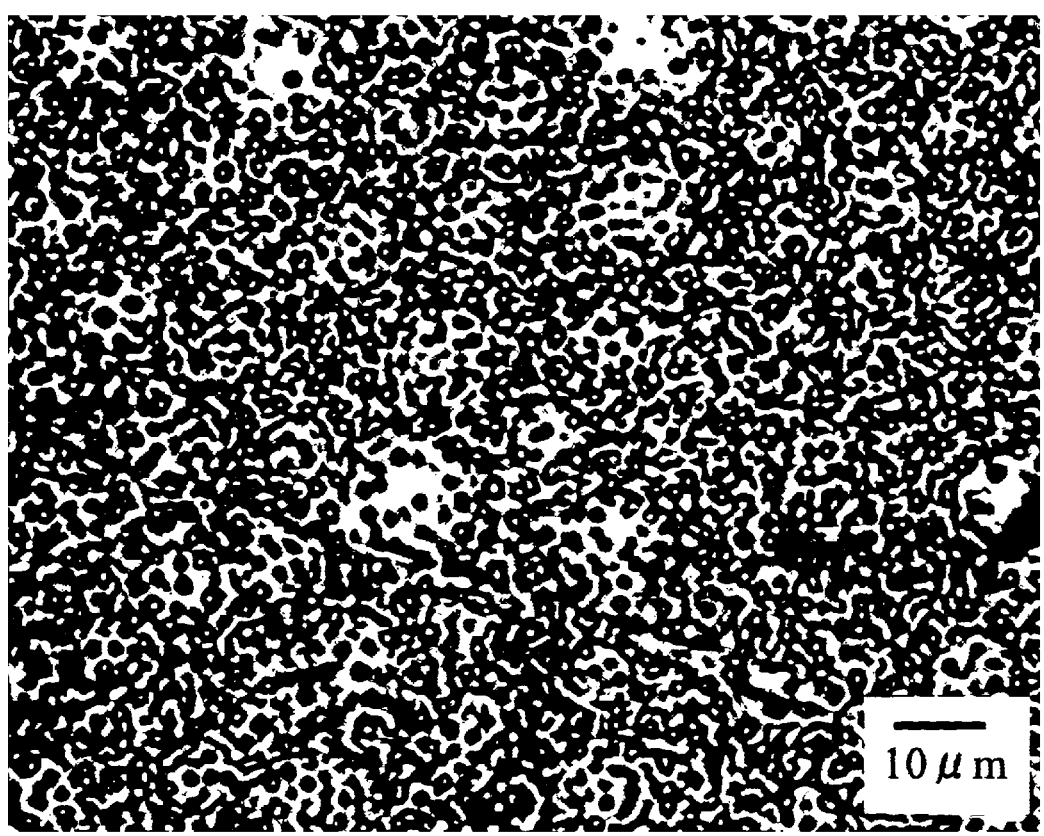
FIG. 6 is a transmission optical microscope photograph of the sheet obtained in Example 4.

Cellulose acetate propionate (2.5 parts by weight) (acetylation degree:2.5%, propylation degree:46%, number-average molecular weight in terms of polystyrene:75000, manufactured by Eastman, Ltd., CAP-482-20) and 2.5 parts by weight of copolyester (fluorene-modified polyester, OPET; manufactured by Kanebo Co. Ltd., OP7-40) were dissolved in 95 parts by weight of tetrahydrofuran (THF). The solution was cast on a triacetylcellulose film with the use of wire bar #34, and the cast film was allowed to stand in an oven at a temperature of 60° C. for 2 minutes, and then THF was evaporated to form a coating layer having thickness of about 2 μm. When a sheet was observed with a transmission optical microscope, the sheet was found to have a droplet phase structure in which two kinds of dispersion phases different in size were dispersed regularly with an average interphase distance. The average particle size (diameter) of large dispersion phase (domain) was about 10 μm, the average particle size (diameter) of small dispersion phase (domain) was about 1.5 μm, the average interphase distance of large dispersion phase (domain) was about 8 to 10 μm, and the average interphase distance of small dispersion phase (domain) was about 2 to 6 μm. The optical microscope photograph of the sheet is shown in FIG. 6. When the total light transmittance of the sheet was measured by a hazemeter (manufactured by Nippon Densyoku Kogyo Co. Ltd., NDH-300A) in accordance with JIS K7105, the total light transmittance was 93%.

Example 5

Cellulose acetate propionate (2.9 parts by weight) (acetylation degree 2.5%, propylation degree: 45%. Number-average molecular weight in terms of polystyrene: 75000, manufactured by Eastman, Ltd., CAP-482-20) and 2.1 parts by weight of copolyester (fluorene-modified polyester, OPET; manufactured by Kanebo Co., Ltd., OP7-40) were dissolved in 95 parts by weight of THF. The solution was cast on a triacetylcellulose film with the use of wire bar #34, and the cast film was allowed to stand in an oven at a temperature of 60° C. for 2 minutes, and then THF was evaporated to form a coating layer having thickness of about 2 μm. When a sheet of the coating layer was observed with a transmission optical microscope, the sheet had a droplet phase structure same as Example 4, in which two kinds of dispersion phases different in size were dispersed regularly with an average interphase distance. Moreover, the total light transmittance of the sheet was 92%.

Example 6

Cellulose acetate propionate (3 parts by weight) (acetylation degree:2.5%, propylation degree:45%, number-average molecular weight in terms of polystyrene:75000, manufactured by Eastman, Ltd., CAP-482-20) and 3 parts by weight of copolyester (fluorene-modified polyester, OPET; manufactured by Kanebo Co., Ltd., OP7-40) were dissolved in 84 parts by weight of THF. The solution was cast on a triacetylcellulose film with the use of wire bar #20, and the cast film was allowed to stand in an oven at a temperature of 60° C. for 2 minutes, and then THF was evaporated to form a coating layer having thickness of about 2 μm. When the sheet of the coating layer was observed with a transmission optical microscope, the sheet had a droplet phase structure same as Example 4, in which two kinds of dispersion phases different in size were dispersed regularly with an average interphase distance. Moreover, the total light transmittance of the sheet was 93%.

Comparative Example 2

Cellulose acetate (75 parts by weight) (manufactured by Daicel Chemical Industries, Ltd., LT-105) was dissolved in 90 parts by weight of a mixed solvent of methylene chloride/methanol (9/1; weight ratio). To the solution was 25 parts by weight of fine particles of crosslinked polymethyl methacrylate (PMMA) (manufactured by Sekisui Kagaku Co. Ltd., MBX-2), and the solution was cast to obtain 50 μm of sheet. When the obtained sheet was observed with a transmission optical microscope, the sheet was found to have a random droplet phase structure. The average diameter of the droplet was 3.0 μm. Moreover, the total light transmittance of the sheet was 92%.

Comparative Example 3

Cellulose acetate (70 parts by weight) (manufactured by Daicel Chemical Industries, Ltd., LT-105) was dissolved in 90 parts by weight of a mixed solvent of methylene chloride/methanol(9/1; weight ratio). To the solution was 30 parts by weight of fine particles of crosslinked polymethyl methacrylate (PMMA) (manufactured by Sekisui Kagaku Co. Ltd., MBP-5), and the solution was cast to obtain 50 μm of sheet. When the obtained sheet was observed with a transmission optical microscope, the sheet was found to have a random droplet phase structure. The average diameter of the droplet was 5 μm. Moreover, the total light transmittance of the sheet was 92%.

[Evaluation of Light-scattering Property]
(1) Transmittable Light-scattering Property of Light-scattering Sheet In the light-scattering sheets obtained in Examples 4 to 6 and Comparative examples 2 to 3, a relationship between a light-scattering intensity and a scattering angle was determined by projecting a light from a normal direction with laser beam scattering automatic measuring device (manufactured by Nihon Kagaku Engineering Co. Ltd.) as shown in FIG. 4.

Figure 7:
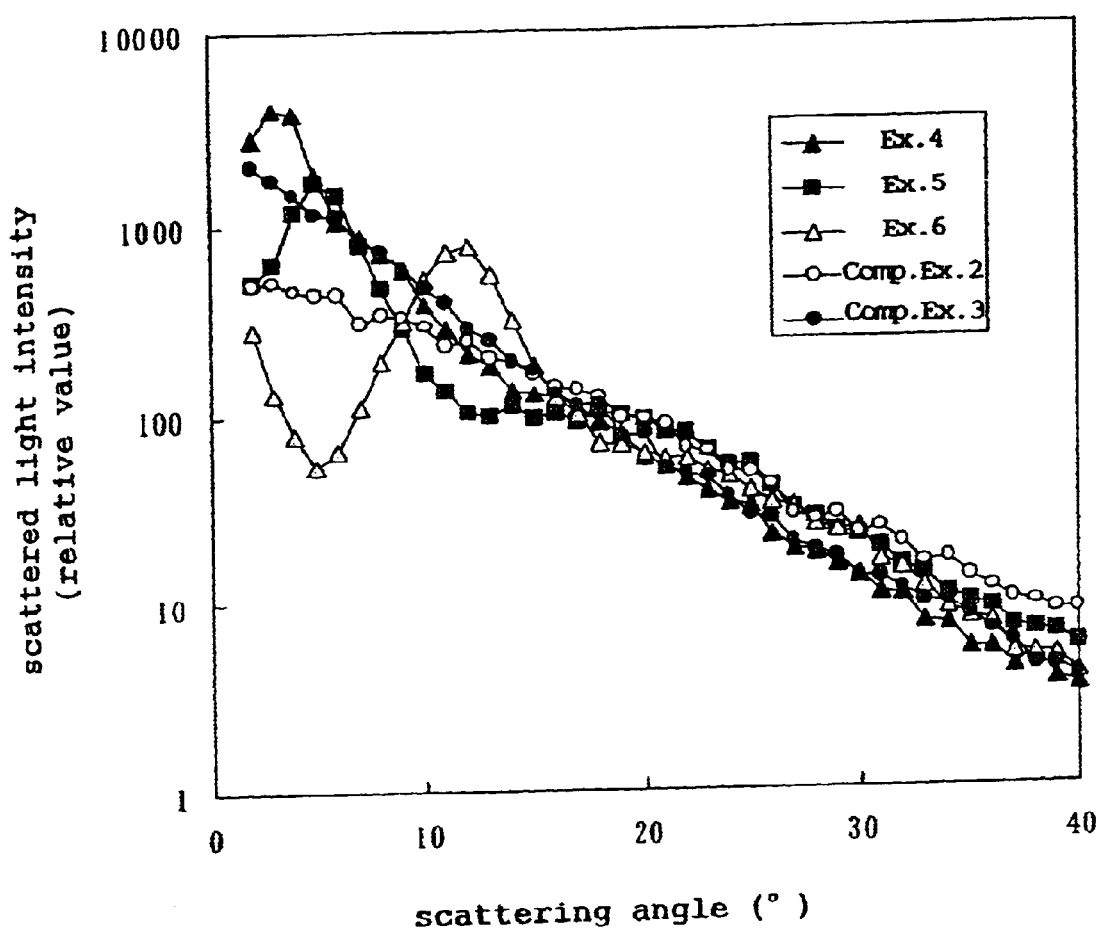
FIG. 7 is a graph showing a relationship between a light-diffusion intensity and a scattering angle in Examples 4 to 6 and Comparative examples 2 to 3.

The results were shown in FIG. 7. As apparent from FIG. 7, while the scattering light intensity showed Gaussioan distribution in the sheet of Comparative Example 2 in which the droplet phase structure randomly distributed, in the sheets of Examples first maximums of the scattered-light intensity were found at specific angles (3° in Example 4, 5° in Example 5, 12° in Example 6) and shoulder type second maximums of the scattered-light intensity were found in far-side angle range.

Figure 8:
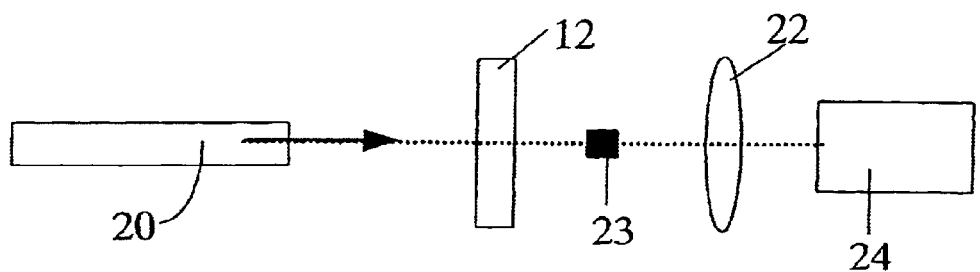
FIG. 8 is a schematic view explaining a measurement method for a light-scattering property of the light-scattering sheet obtained in Example 5.

As shown in FIG. 8, a light was incident from a normal direction to the light-scattering sheet, and the image of the transmitted and scattered light was gathered at lens 22 to observe the image by a laser beam scattering measuring device (manufactured by Otsuka Denshi Co. Ltd., DYNA-3000) equipped with CCD camera 24 as a two-dimensional detector. Incidentally, a linearly advancing light was intercepted by direct beam stopper 23.

Figure 9:
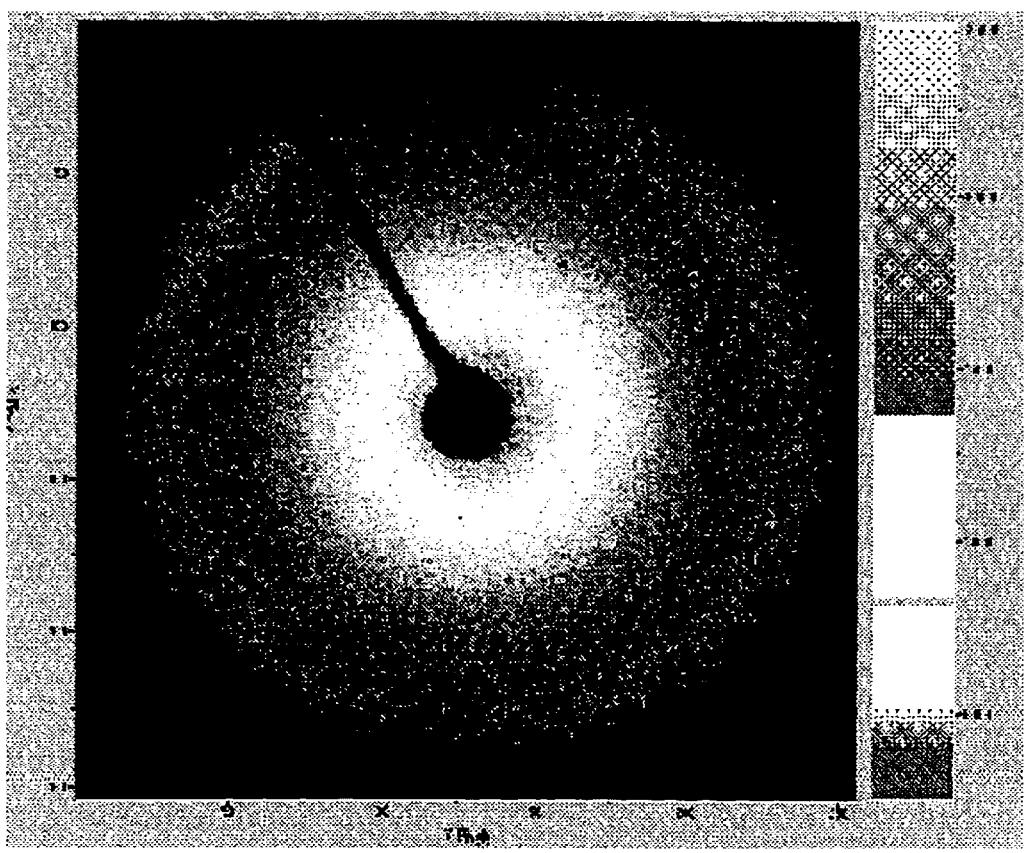
FIG. 9 is an image photograph showing a light-scattering image of the light-scattering sheet obtained in Example 5.

The results are shown in FIG. 9. As apparent from FIG. 9, a ring-like strongly scattered-light appeared at smaller angle range. Further, ring-like scattered-light also appeared at larger angle range, two maximums are found in the distribution of the scattered-light intensity.

(2) Brightness of Display

Reflecting type LCD model units shown in FIG. 3 was constructed with the use of the light-scattering sheet obtained in Examples 4 to 6 and comparative Example 2 to 3. Each unit was illuminated with a white spot light from an oblique and upper direction at an angle of incidence (scattering angle θ2) and the intensity of reflected light emerged in a perpendicular direction from the front side was measured as shown in FIG. 3. The intensity of reflected light in the perpendicular direction for the angle of incidence (scattering angle θ2) was evaluated according to the following criteria. The results are shown in Table 2.

◎: considerably bright
○: bright
Δ: normal to dark

TABLE 2

| Difussion Angle (θ2) | Example 4 | Example 5 | Example 6 | Comparative Example 2 | Comparative Example 3 |
|---|---|---|---|---|---|
| 5° | ◎ | ◎ | ○ | ○ | ◎ |
| 10° | ◎ | ◎ | ◎ | ○ | ○ |
| 15° | ○ | ◎ | ◎ | ○ | ○ |
| 20° | ○ | ○ | ◎ | Δ | ○ |
| 25° | Δ | ○ | ○ | Δ | Δ |
| 30° | Δ | ○ | ○ | Δ | Δ |

As apparent from Table 2, the transmittable light-scattering sheets of Examples 4 to 6, the reflection-light intensities at the specific light-scattering angles were strong, and had high directionalities, and further the display surface was capable of being brightened over wide angle range.

What is claimed is:

1. A transmittable light-scattering sheet which comprises a light-scattering layer composed of a plurality of polymers varying in refractive index and having at least a droplet phase structure, wherein the layer has a phase separation structure formed by spinodal decomposition from a liquid phase comprising the plurality of polymers.

2. The transmittable light-scattering sheet according to claim 1, wherein an incident light is diffused isotropically, and a maximum value of scattered light intensity appears at a scattering angle of 3 to 40°.

3. The transmittable light-scattering sheet according to claim 1, wherein an average diameter of droplets in the droplet phase structure is 0.1 to 20 μm.

4. The transmittable light-scattering sheet according to claim 1, wherein an average distance between droplet centers is 0.5 to 15 μm and a standard deviation of the average distance is 40% or less of the average distance in the droplet phase structure.

5. The transmittable light-scattering sheet according to claim 1, wherein the proportion of droplets in the droplet phase structure is 30 to 70 volume % based on the whole light-scattering layer.

6. The transmittable light-scattering sheet according to claim 1 which comprises a light-scattering layer scattering an incident light isotropically, wherein the light-scattering layer expresses maximum values of a scattered light intensity at two scattering angles.

7. The transmittable light-scattering sheet according to claim 6, wherein a smaller angle θa of the maximum value is 2 to 20° in the scattered light intensity.

8. The transmittable light-scattering sheet according to claim 6, the ratio of a smaller angle θa to a larger angle θb of maximum values is θb/θa=1.5 to 10.

9. The transmittable light-scattering sheet according to claim 6, wherein the light-scattering layer has at least a droplet or an island-in an ocean phase structure, and a distribution of particle size of dispersed phase in the phase structure has two peaks at different average particle sizes.

10. The transmittable light-scattering sheet according to claim 1, wherein a total light transmittance is 70 to 100%.

11. The transmittable light-scattering sheet according to claim 1, wherein a difference between refractive indexes of the plurality of polymers is 0.01 to 0.2.

12. The transmittable light-scattering sheet according to claim 1, wherein the plurality of polymers comprises a first polymer and a second polymer selected from a styrenic resin, a (meth)acrylic resin, a vinyl ester-series resins, a vinyl ether-series resin, a halogen-containing resin, an alicyclic olefinic resin, a polycarbonate-series resin, a polyester-series resin, a polyamide-series resin, a silicone-series resin, a cellulose derivative and a rubber or an elastomer, and the ratio of the first polymer to the second polymer is the former/the latter=10/90 to 90/10 (weight ratio).

13. The transmittable light-scattering sheet according to claim 1, wherein at least one polymer comprises a cellulose ester.

14. The transmittable light-scattering sheet according to claim 1, wherein at least one polymer comprises a cellulose acetate.

15. The transmittable light-scattering sheet according to claim 1, which comprises a transparent support and the light-scattering layer laminated on at least one side of the transparent support.

16. The transmittable light-scattering sheet according to claim 15, wherein the transparent support is optically isotropic.

17. The transmittable light-scattering sheet according to claim 15, wherein the transparent support comprises cellulose acetate film.

* * * * *

UNITED STATES PATENT AND TRADEMARK OFFICE
CERTIFICATE OF CORRECTION

PATENT NO. : 6,788,368 B2  Page 1 of 1
DATED : September 7, 2004
INVENTOR(S) : Takahashi et al.

It is certified that error appears in the above-identified patent and that said Letters Patent is hereby corrected as shown below:

<u>Column 26,</u>
Line 7, add the following claims:
18. A reflective liquid crystal display unit which comprises a liquid crystal cell having a liquid crystal sealed therein, a reflecting means for reflecting an incident light disposed behind the liquid crystal cell, and the light-scattering sheet recited in Claim 1 disposed forwardly of the reflecting means.
19. The reflective liquid crystal display unit according to claim 18, wherein a polarizing plate is disposed forwardly of the liquid crystal cell, and the light-scattering sheet recited in Claim 1 is disposed between the liquid crystal cell and the polarizing plate.
20. The reflective liquid crystal display unit according to claim 18, which comprises a liquid crystal cell having a liquid crystal sealed therein, a reflecting means for reflecting an incident light disposed on one side of the liquid crystal cell, a polarizing means for polarizing a reflective light is disposed on the other side of the liquid crystal cell, and the light-scattering sheet recited in Claim 1 disposed between the liquid crystal cell and the polarizing means.
21. The transmittal light-scattering sheet according to Claim 1, wherein the plurality of polymers vary in refractive index.

Signed and Sealed this

Sixteenth Day of May, 2006

JON W. DUDAS
*Director of the United States Patent and Trademark Office*